June 5, 1962 — V. K. ZWORYKIN ET AL — 3,038,154
APPARATUS FOR METEOROLOGICAL EXPLORATION
Filed July 28, 1948
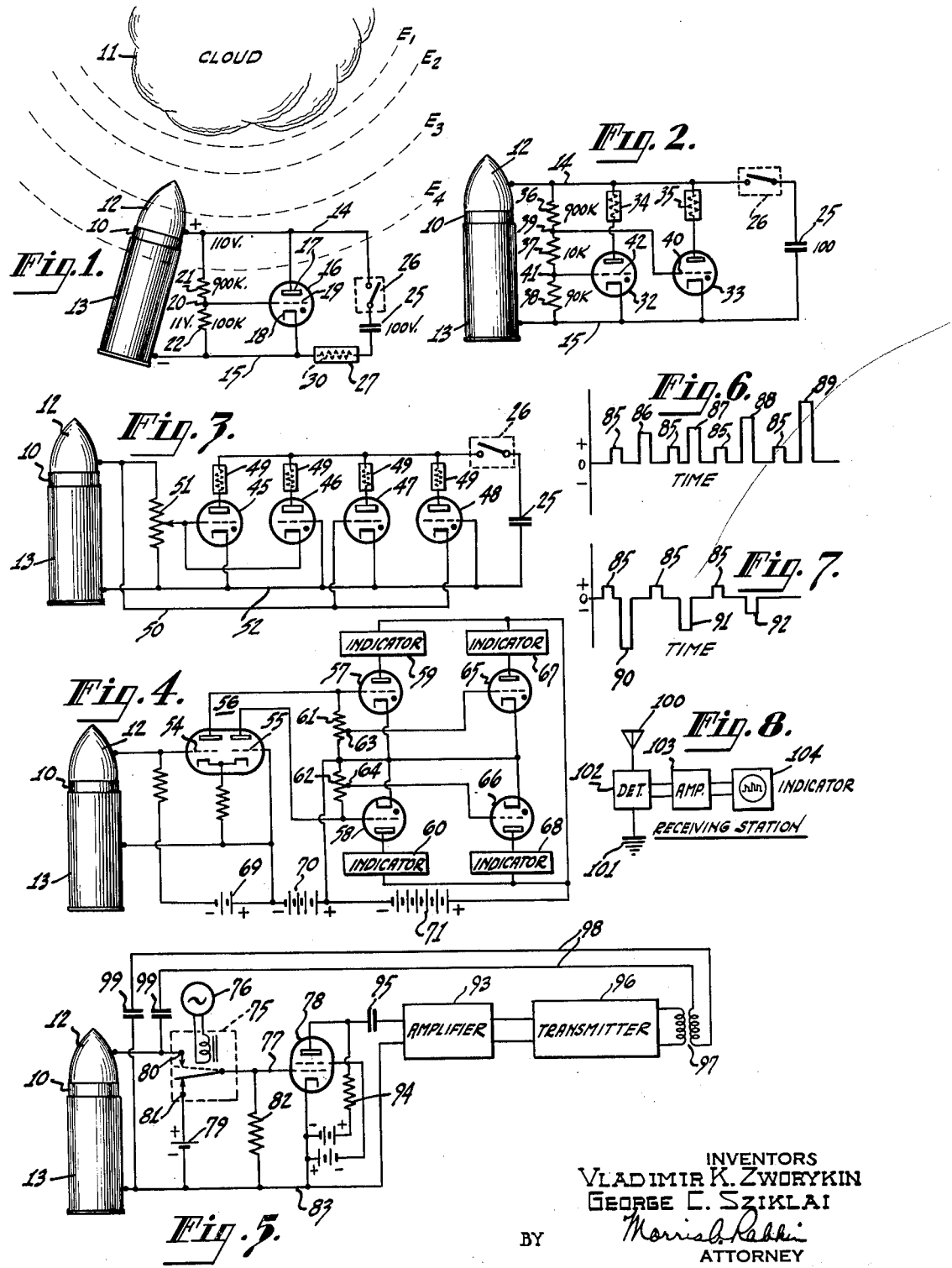
INVENTORS
VLADIMIR K. ZWORYKIN
GEORGE C. SZIKLAI
BY
ATTORNEY

United States Patent Office 3,038,154
Patented June 5, 1962

3,038,154
APPARATUS FOR METEOROLOGICAL EXPLORATION
Vladimir K. Zworykin and George C. Sziklai, Princeton, N.J., assignors to Radio Corporation of America, a corporation of Delaware
Filed July 28, 1948, Ser. No. 41,046
2 Claims. (Cl. 340—366)

The present invention relates to apparatus for meteorological exploration, and more particularly to apparatus of that character for exploring the potential gradient in atmospheric space in and near cloud formations and the like.

It is known that electrical charges in clouds create electrical fields or potential gradients having equi-potential lines which, under proper exploration, can provide useful information regarding their motion and the motion of neighboring air masses.

It is, therefore, a primary object of this invention, to provide an improved method and means for making meteorological observations by exploring charged areas in the atmosphere in or near clouds and moving air masses.

It is also a further object of this invention, to provide a medium velocity missile or rocket which on approaching or passing through charged areas in the atmosphere may transmit an intelligence to a ground or other observation post regarding the polarity and magnitude of the charge at a particular point in the atmosphere and the gradient of the electrical field thereat.

It is a still further object of the invention, to provide an improved system for making meteorological observations of the potential gradient in the atmosphere at predetermined locations comprising potential responsive projectile means which may be directed in a predetermined path at a predetermined speed, thereby to traverse predetermined portions of the atmospheric space in a predetermined time interval and to transmit to an observation station therefrom, potential gradient indications which are also indicative of the motion or condition of the atmosphere in a predetermined area.

In accordance with the invention, a missile fired from the ground or from a position in the air, or a rocket or jet-propelled missile, preferably self destroying beyond the useful trajectory is provided with spaced electrodes or antenna elements fore and aft, or in tandem relation, to receive differences of potential existing in charged areas traversed thereby, and electronic tube means therein responsive to such potential difference for releasing intelligence in the form of signals or light as the exploring body traverses the electrical fields present in the area being traversed. When the missile crosses fields which have a greater potential gradient than a predetermined value, the additional potential is arranged to fire an electronic tube which releases energy to operate the indicating means. The latter may be an explosive fuse giving visual indication to the ground or other observation post, a resonant circuit in which high frequency transients are generated to be picked up at the ground or other observation post by radio receiver means tuned to the same frequency, or a sensitive relay actuating any other type of indicator.

If the velocity of the missile and the potential difference required to actuate the apparatus to provide the indication are known, by proper timing, exact information is obtained regarding the position of the potential difference in space to which the missile is adjusted.

The novel features which are considered to be characteristic of the invention are set forth with particularity in the appended claims. The invention itself, however, both as to its organization and method of operation, as well as additional objects and advantages thereof, will best be understood from the following description of various modifications thereof when read in connection with the accompanying drawings, in which:

FIGURE 1 is a schematic circuit diagram of apparatus embodying the invention,

FIGURES 2–5 inclusive are further schematic circuit diagrams of various modifications of the invention based upon the arrangement of FIGURE 1, FIGURES 6 and 7 are graphs showing certain operating characteristics of the embodiment of the invention shown in FIGURE 5, and FIGURE 8 is a schematic circuit diagram of a signal receiving system for a ground or other observation post for use in connection with the apparatus shown in FIGURES 4 and 5, for example, in accordance with the invention.

Referring to FIGURE 1, an elongated missile 10 is shown approaching a cloud 11 and passing through equipotential lines $E_1$–$E_4$ inclusive, of an electrical field adjacent the cloud. The missile may be of any suitable type adapted for projection from the ground or from a plane and may be propelled in any suitable manner to give it a predetermined known direction or trajectory and a predetermined known relatively low speed through the atmosphere in the region of the desired exploratory observation, such as in the electrical field indicated. The missile is provided with at least two spaced electrodes or antenna means arranged in a fore and aft or tandem arrangement, which in the present example, are provided by a conducting insulated nose 12 and the casing or body 13 in the rear thereof, which is also of conducting material. The missile contains electronic tube apparatus and indicating means illustrated for convenience and clarity externally thereto in the diagram, and connected between a circuit lead 14 which is connected with the nose or forward electrode, and a circuit lead 15 which is connected with the casing or rear electrode 13, as shown. A grid-controlled gaseous discharge tube 16, which may be of the miniature "thyratron" type, is provided with an anode electrode 17 connected with the lead 14, a cathode electrode 18 connected with the lead 15, and a control grid 19 connected to an intermediate tap point 20 on a high resistance voltage divider network connected between the leads 14 and 15, and comprising, in the present example, a pair of series connected resistors 21 and 22.

Also connected across the leads 14 and 15 is a capacitor 25, a switch 26, and a current responsive indicator device 27 in series. The capacitor is charged initially, and before the missile is fired, to a potential value sufficient to operate or fire the tube 16, as a source of anode potential therefor, and to provide at the tap point 20, a biasing potential on the grid 19 with respect to the cathode 18, which is normally below the firing potential of the tube. The capacitor is connected in circuit after the release of the missile, by the switch 26 which may be of any suitable type responsive to impact, such as a set-back switch.

As the missile moves through the space, the main electrodes of the thyratron control tube 16, are connected in parallel with the capacitor and directly with the electrodes 12 and 13 of the missile, with the indicator 27 in series with the capacitor and the space path of the electronic tube. When the missile crosses fields which have a greater potential gradient within the distance between the forward electrode or nose 12 and the rearward electrode or casing 13, than the additional potential required to fire the electronic tube, the circuit of the capacitor 25 through the tube and the indicator 27 becomes closed upon firing of the tube. If the capacitor is originally charged to a difference of potential of 100 volts so that a potential difference of 100 volts exists between the nose and the body of the missile, and if the tap point 20 is set, for example, to provide a potential of 10 volts on the grid 19, which has a firing potential of 11 volts, a potential difference of 10 volts between the equi-potential lines $E_3$ and $E_4$, between which the missile is shown, will cause the capacitor to be charged to substantially 110 volts, thereby raising the potential at the terminal 20 to 11 volts and causing the tube 16 to fire.

In order to maintain the charge on the capacitor at substantially a fixed value prior to entering an electrical field, the resistance of the bleeder circuit 21—22 is made relatively high and in the present example the resistor 21 may be considered to have a resistance of 900,000 ohms and the resistor 22 to have a resistance value of 100,000 ohms. With this arrangement, the voltage applied to the grid is always 1/10 of the total value across the space path of the tube.

Upon closing of the circuit through the tube, the capacitor 25 is discharged through the indicator 27 and the current causes the indicator to operate. In the present example, the indicator may be a cartridge containing a resistance wire 30 which sets off an explosive charge contained in the cartridge, thereby giving a visual indication to an observation point within range of visibility. The cartridge may contain any of several different salts, for example such as a strontium salt which will give a red flash, a barium salt which will indicate by a green flash, sodium salt providing a yellow light, or potassium salt which will show purple. The various uses of these particular salts and the like will be referred to hereinafter in connection with other modifications of the invention.

The system shown in FIGURE 1 provides an indication at a predetermined point in the atmosphere that the potential gradient between the nose or forward antenna electrode and the body or rear antenna electrode of the missile is located at that instant in an electrical field having a potential gradient above a certain value, such as, for example, 10 volts for the system described.

Referring to FIGURE 2, an embodiment of the invention is shown which provides information regarding the potential gradient at more than one point in the atmosphere with a given flight of a projectile or missile, and is indicative of the extent to which the circuit of FIGURE 1 may be modified to provide such additional information. Like reference characters refer to like elements as in FIGURE 1.

The forward electrode 12 and the rear electrode or body 13 of the missile 10 are provided respectively with the connection leads 14 and 15 as in the circuit of FIGURE 1, between which is connected the pre-charged capacitor 25 through the set-back switch 26. Two or more grid-controlled gaseous discharge tubes 32 and 33 are connected across the capacitor circuit between the leads 14 and 15 and between the electrodes 12 and 13, each through a current responsive indicator device, such as 34 and 35 respectively. A grid-controlling potential divider network comprises three resistor elements 36, 37 and 38 connected in series, in the order named, between the leads 14 and 15, providing a grid tap connection 39 for the grid 40 of the tube 33 and a grid tap connection 41 for the grid 42 of the tube 32.

With this arrangement, the tube 33 will fire first in response to a predetermined added potential between the electrodes 12 and 13, followed by firing of the tube 32 when the projectile passes through a field providing a still higher potential difference between the electrodes 12 and 13. By adjusting the relative values of the resistors 36, 37 and 38 the minimum voltages across the electrodes or antenna elements 12 and 13 for firing the tubes may be determined. In the present example, with the values as given, the tube 33 will fire when the potential difference between the nose and the body of the missile is 110 volts and the second tube will fire when the voltage rises to 120 volts. With this arrangement, the cartridge or indicator 35 will fire to indicate a potential difference of 10 volts in the atmosphere and the indicator 34 will fire when the potential difference is 20 volts.

Depending upon the initial charge applied to the capacitor 25 and the values set up in the voltage divider network, higher potential differences may be registered, the lower the initial charge, the higher the potential required in the atmosphere to cause an indication. While two indicators have been shown in the present example, a greater number may be provided as will hereinafter be shown, and the indicators may be provided with different explosive material to provide different color indications as hereinbefore pointed out. With this arrangement, knowing the speed of the missile and its trajectory path, its position with respect to a cloud formation or other region in the atmosphere may be calculated accurately at the time of the indication and the potential difference indications give direct data for the computation of the potential gradient.

Referring to FIGURE 3, a further modification of the system of FIGURE 1 is shown, which may provide an indication of the polarity of the potential difference to which the missile is subjected at any point, since the polarity of the nose or forward electrode may at times not be positive with respect to the rear electrode as in the preceding examples.

In this modification as applied to the missile, four or more grid-controlled gaseous discharge tubes 45, 46, 47 and 48 are each provided with a series indicator or cartridge 49 containing different indicating materials, which upon heating and explosion provide different visual indications depending upon the material. This may be provided by the various strontium, barium, sodium and potassium salts hereinbefore referred to, to provide red, green, yellow and lilac indications respectively, when the pre-charged capacitor 25 is discharged after closure of the set-back switch 26, this arrangement being the same as in the preceding example but utilizing four indicators.

Whereas the circuit of FIGURE 2 provides for an indication of two differences in potential gradient, the present circuit provides an indication of the same number of points in the atmosphere, and in response to both positive and negative polarization of the forward electrode or nose 12 of the projectile 10 with respect to the rear electrode or body 13.

In this arrangement, a lead 50 from the nose or forward electrode is connected to the grid of the tube 47 and to the cathode of the tube 48 directly while the grid of the tube 45 and the cathode of the tube 46 are connected through an adjustable potentiometer 51 with the nose 12. In the same manner, the cathode of the tube 47 and the grid of the tube 48 are connected through lead 52 with the rear electrode 13, together with the cathode of the tube 45 and the grid of the tube 46. Thus, one half of the electronic tubes 46 and 48 are connected with reversed grid-cathode terminals and, accordingly, these tubes fire when the nose 12 becomes more negative than the body 13 of the missile, and because of the potentiometer arrangement as shown, the tubes 45 and 46 will fire at a higher potential gradient than the tubes 47 and 48, thereby providing the desired polarity and magnitude indications as the missile passes through a charged region having sufficient potential gradient between the nose and the body of the missile to fire the indicators in response to operation of the tubes.

Referring now to FIGURE 4, a circuit arrangement is shown which provides greater sensitivity than the previous circuits, although it operates to produce substantially the same results as the circuit of FIGURE 3. In this embodiment of the invention, the nose or forward electrode 12 of the missile 10 is connected to one input grid 54 and the rear electrode 13 is connected to the other input grid electrode 55 of a push-pull D.-C. amplifier 56 which is coupled directly to the control electrodes of two grid-controlled gaseous discharge tubes 57 and 58 each having in circuit therewith an indicator means 59 and 60 respectively. The D.-C. amplifier shown operates in accordance with the amplifier system covered by the patent to G. C. Sziklai, 2,368,582 of January 30, 1945. The indicators may be cartridges adapted to be fired by current flow, as in the embodiment of FIGURES 1 and 2, or any other current responsive means for giving an indication of the operation of the system to a remote observation station such as by radio wave, as will be hereinafter described.

The coupling is provided across a voltage divider comprising two series connected resistors 61 and 62 having grid tap points 63 and 64 thereon for two additional grid-controlled gaseous discharge tubes 65 and 66, likewise having in series therewith suitable indicator means 67 and 68 respectively. Operating potentials for the various electrodes of the tubes are provided by suitable batteries indicated at 69, 70, and 71, the first being a bias supply battery and the latter two being anode supply batteries for the D.-C. amplifier and grid-controlled gaseous discharge tubes respectively.

The potentiometer arrangement provided for the grids of the tubes 65 and 66 permits the firing of these tubes in response to a higher potential than that for which the tubes 57 and 58 are responsive. The D.-C. amplifier provides highly amplified control potentials for the grids of the tubes, which are connected in such a manner that, when the nose 12 is negative, the tube 57 will fire first, and as the potential increases, the tube 65 will fire. If the potential reverses on the nose and the body of the missile, as when the missile passes through a negatively charged cloud, the tube 58 will fire and then the tube 66 will follow if the potential gradient increases, thereby operating the indicators in the order named, to indicate to the observation post the polarity and magnitude of the charge in the area under investigation at four different points.

It is obvious that additional points may be observed in one flight of the missile by the provision of additional circuits, although the limitation in size of the projectile is a limitation in the number of circuits which may be provided. However, in order to obtain further observations additional flights may be provided in any case.

In accordance with the invention, a continuous indication of the potential difference applied to the missile may be obtained and the information or intelligence with regard to the atmospheric conditions, that is, the condition of the charge along any given trajectory or course of the missile, may be transmitted by a radio signal, and this arrangement, as is obvious, may be applied in any of the preceding embodiments. Such an arrangement is shown in FIGURE 5, to which attention is now directed.

In the circuit comprising the present embodiment of the invention, a vibrator switch 75 responsive to a source of alternating or vibratory current indicated at 76, is arranged to connect the grid circuit 77 of amplifier stage 78 alternately to the nose or forward electrode 12 of the missile 10 and to a standard potential provided by a source indicated at 79. Between the contacts 80 and 81 of the switch device 75 the grid circuit 77 is connected to ground and cathode through a resistor 82. The ground or cathode lead indicated at 83 is connected to the body or rear electrode 13 of the missile.

The potential applied to the grid circuit by the vibratory contact device is indicated in FIGURE 6, the short pulses 85 being indicative of the potential supplied by the standard 79 and the increasingly elongated pulses indicated at 86, 87, 88 and 89, respectively representing the potential received from the nose of the projectile with respect to the body, being thereby applied between the control grid and cathode of the amplifier stage 78. This results when the projectile passes through a charged area near or in a cloud in which the potentials at the nose of the projectile are positive with respect to the potentials on the body of the missile. The increasing length of pulses indicates that the missile is passing through increasingly steeper potential gradients.

Should the potential on the forward electrode become negative with respect to the reference potential or standard, the pulses 90, 91 and 92, FIGURE 7, will result as the projectile passes from a stronger to a weaker field, the normal standard pulses being indicated at 85, as in the preceding figure.

These signals are further amplified by a suitable amplifier 93 coupled to the amplifier stage 78 across a suitable coupling impedance 94 by means of the usual coupling capacitor arrangement indicated at 95. The ouput of the amplifier is fed to a small transmitter 96 which in turn is coupled through an impedance changing transformer 97 and a transmission line 98 to the electrodes 12 and 13 which, thereby, simultaneously act as a transmitting as well as a receiving antenna. Series capacitors 99 in the leads 98 serve to isolate the transformer 97 and prevent short-circuiting the electrores 12 and 13 through the transformer windings for the reception of signals. In any case, however, the impedance of the transformer secondary is relatively high at the frequency of operation.

The modulation applied to the transmitter from the amplifier 93 results in the transmission of pulses of varying amplitude and polarity which may be picked up at an observation station located at the ground or any suitable position such as on a plane. Such a signal receiving station is indicated diagrammatically in FIGURE 8, to which attention is now directed.

In this circuit, a usual antenna 100 for picking up the desired signals and ground connection 101 is provided for a tunable signal detector indicated at 102. This is coupled to a suitable amplifier 103 which in turn is connected with an indicator 104 of any suitable type. This may be an oscilloscope or other form of indicator for providing the desired indication of the pulse type and intensity. Together with a transmitting projectile, this provides a system for meteorological exploration for observing the potential gradient and polarity in any portion of the atmosphere within the reach of a rocket or projectile.

Since the system provides relatively low cost apparatus in the missile as well as at the observation station, and as the missiles are therefore substantially expendible at low cost, the system has a wide application in furnishing meteorological observations over extended areas during any desired time for observation. It is obvious that the missiles may be made self-destroying in response to the operation after a limited delay or beyond the useful trajectory, so that they may not do any damage in falling.

The information obtained by the present method and means may be used for the control of cloud movements to effect certain weather changes. If two clouds, which have been found to have similar charges, are brought close by elevating one by spraying it with graphite or other finely divided heat absorbing particles or lowering the other by spraying it with metallic or other heat reflecting particles, the two clouds will repel each other horizontally. By this means large clouds and air masses may be moved in a desired manner. By bringing together two clouds which have been found to have opposite charges, a large scale electric disturbance and precipitation may be obtained.

Thus with this arrangement, and its various modifications as shown herein, the field of meteorological observation may considerably be extended and the work of predicting and controlling the weather may greatly be advanced.

We claim as our invention:

1. Apparatus for meteorological exploration with respect to the potential gradient in atmospheric space in and near cloud formations and the like comprising a missile which may be directed in a predetermined path at a predetermined speed through space in the region of cloud formations and the like, thereby to traverse predetermined electrically charged portions of said atmospheric space in a predetermined time interval, and electronic means carried thereby and including spaced electrodal elements subject to the potential gradient in the atmospheric space for indicating the magnitude and polarity of said potential gradient along a predetermined portion of the path of said missile, a plurality of grid controlled gaseous discharge tubes, at least two of which have like electrodes connected with said electrodal elements in the same polarity and at least two others of which have like electrodes connected with said electrodal elements with reversed polarity, and potentiometer means connected between said electrodal elements to provide a grid controlling potential for one of said first named two tubes and one of said second named two tubes.

2. Meteorological exploration apparatus for determining a potential gradient in atmospheric space in and near cloud formations and the like comprising a missile which may be directed in a predetermined path to traverse predetermined electrically charged portions of atmospheric space in a predetermined time interval, said missile having an insulated nose and body providing insulated forward and rearwardly positioned antenna means, a switch, a charged capacitor connected between said antenna means through said switch, said switch being adapted to be closed only when said missile is projected through space, indicator means and the space path of an electron discharge device connected serially across said capacitor, said indicator means being responsive to current resulting from discharge of said capacitor through said electron discharge device, said indicator means including a cartridge providing a visual indication in response to predetermined current flow therethrough, and said electron discharge device having a predetermined firing potential above the potential of said capacitor by an amount equal to the potential gradient to be observed in atmospheric space.

References Cited in the file of this patent

UNITED STATES PATENTS

| | | |
|---|---|---|
| 1,919,215 | Gunn | July 25, 1933 |
| 2,463,527 | Dunmore | Mar. 8, 1949 |

FOREIGN PATENTS

| | | |
|---|---|---|
| 368,062 | Italy | Feb. 8, 1939 |